SWEEP VOLTAGE WAVEFORM GENERATOR

Filed Oct. 27, 1967

INVENTOR
D.P. BORENSTEIN
BY G. E. Hirsch Jr.
ATTORNEY

United States Patent Office 3,522,447

Patented Aug. 4, 1970

3,522,447

SWEEP VOLTAGE WAVEFORM GENERATOR

David P. Borenstein, Red Bank, N.J., assignor to Bell Telephone Laboratories, Incorporated, Murray Hill and Berkeley Heights, N.J., a corporation of New York Filed Oct. 27, 1967, Ser. No. 678,640

Int. Cl. H03k *3/00, 4/00*

U.S. Cl. 307—228 5 Claims

ABSTRACT OF THE DISCLOSURE

A circuit for generating a linear sweep voltage waveform includes a capacitor which is charged from a high impedance current source. Resistive loading, a primary source of sweep nonlinearity, is mitigated by a feedback circuit arrangement which corrects for any nonlinearity in the sweep waveform.

BACKGROUND OF THE INVENTION

Field of the invention

This invention pertains to the generation of electrical signals and, more particularly, to the generation of linear sweetp voltage waveforms. It finds particular use in video systems.

Description of the prior art

Multitudinous circuits exist for generating sweep waveforms having a relatively linear characteristic. Such circuits generally rely upon the charging of a capacitive device by a source of constant current. Ideally, the slope of the characteristic of the waveform generated is linearly proportional to the quotient of the charging current and the value of capacitance. However, as is true with most physically realizable circuits, the presence of connected circuits, and other stray variables, make the ideal relatively unobtainable. The loading effect of such circuits, e.g., buffer stages, particularly manifests itself in applications where slow sweep speeds are required. Electrolytic capacitors, preferable because of their small size, are generally not satisfactory because they lack the accuracy and stability required in such applications. Resort to smaller value nonelectrolytic capacitors entails the use of lower current charging levels. It is in such cases that loading across the capacitor becomes a substantial source of sweep nonlinearity.

It is therefore an object of this invention to generate sweep voltage waveforms having an extremely linear characteristic.

SUMMARY OF THE INVENTION

This and other objects are accomplished, in accordance with the inventive principles described herein, by selectively altering the sweep current of a capacitor of a sweep circuit by an amount sufficient to compensate for loading, due to buffer stages, stray variables, and other connected circuits.

More particularly, a sweep circuit, in accordance with the principles of this invention, comprises a capacitor connected between a source of constant potential and the collector of a first transistor. Discharge of the capacitor is accomplished by switching apparatus connected in shunt with the capacitor. The sweep output signal obtained at the collector of the first transistor is applied to the base of a second transistor which has a resistive element connected to its emitter terminal. An emitter resistor of the first transistor is connected to a predetermined point intermediate the terminals of the emitter resistive element of the second transistor. As will be shown hereinafter, any nonlinearity of the sweep waveform attributable to loading across the capacitor is substantially removed by adjustment of the emitter resistive element of the second transistor.

These and further features and objects of this invention, its nature and various advantages, will be readily apprehended upon consideration of the attached drawings and of the following detailed description of the drawings.

DETAILED DESCRIPTION OF THE INVENTION

Figure 1:
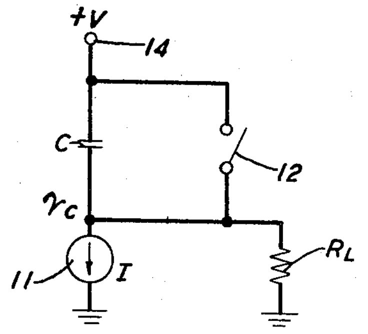
FIG. 1 PRIOR ART
FIG. 1 is a schematic circuit diagram of a conventional sweep circuit.
Figure 2:
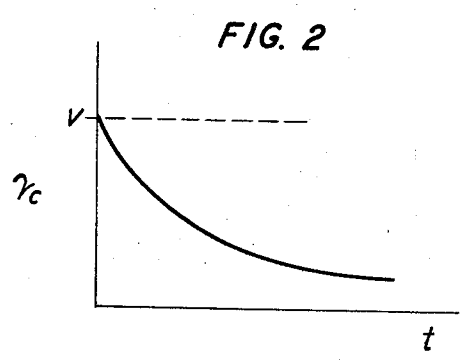
FIG. 2 is a graphical illustration of a nonlinear sweep waveform generated by the circuit of FIG. 1.

A conventional sweep circuit, depicted in FIG. 1, comprises a source, not illustrated, of potential V, a capacitor C, and a source 11 of constant current, serially connected. Switch 12, connected in shunt with capacitor C is used to discharge the capacitor at the termination of each sweep. Of course, switch 12 is preferably an electronic switch, of any well-known type, and is merely illustrated as a mechanical switching device. Resistor $R_L$ represents the load on the sweep circuit; it may comprise a buffer stage or any other circuitry which is driven by the sweep circuit. The initial voltage across capacitor C, when switch 12 is opened, corresponds to the potential V of the source applied to terminal 14. As capacitor C is charged by current source 11, the voltage across capacitor C decreases in an approximately linear fashion, as illustrated by the waveform of FIG. 2. It is noted that a discernible nonlinearity is present; this inherent sweep nonlinearity arises from the presence of resistive load $R_L$.

Analytically, the sweep voltage may be expressed as:

$$v_c(t)=V-\frac{It}{C}-\frac{1}{C}\int_0^t\frac{v_c(t)}{R_L}\,dt \tag{1}$$

Thus, the slope of the sweep voltage is:

$$\frac{dv_c(t)}{dt}=\frac{-I}{C}-\frac{v_c(t)}{CR_L} \tag{2}$$

The latter term of Equation 2 represents the deviation of the sweep voltage waveform from perfect linearity due to the presence of resistor $R_L$.

Figure 3:
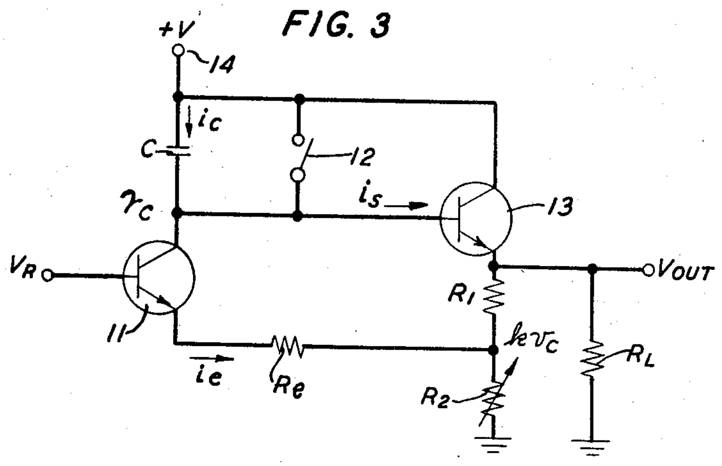
FIG. 3 is an illustrated sweep circuit, in accordance with the principles of this invention, which generates a sweep waveform having a linear characteristic.

FIG. 3 illustrates a practical sweep circuit wherein the undesired nonlinearity of the sweep voltage waveform has been removed. Like numerals are utilized to identify elements equivalent to those of FIG. 1. Transistor 11, responsive to reference voltage $V_R$, functions as a high impedance source of current. Capacitor C, shunted by switch 12, is connected between the collector of transistor 11 and a source of potential V connected to terminal 14. If emitter resistor $R_e$ were returned to ground, the circuit of FIG. 3 would be a practical realization of the sweep circuit of FIG. 1. Transistor 13 and its connected circuit of FIG. 3 would be a practical realization of the correspond to load resistor $R_L$ of FIG. 1.

Resistor $R_e$, however, is not returned to ground but, rather, is returned to the junction of fixed resistor $R_1$ and variable resistor $R_2$, which are serially connected to the emitter of transistor 13. Resistors $R_1$ and $R_2$ may comprise a potentiometer, if so desired. The voltage across resistor $R_e$, and thus the current in transistor 11 is now a function of the input reference voltage, ($V_R$), and of the indicated capacitor voltage $v_c$ as will be analytically shown hereinafter. If the value of resistor $R_2$ is chosen properly, in accordance with the teachings of this invention, the sweep voltage appearing at the output terminal of capacitor C is made to be extremely linear. In order to substantially reduce the output impedance of the circuit, the sweep output voltage is preferably obtained at the emitter of transistor 13 instead of at a terminal of capacitor C.

The sweep voltage $v_c(t)$ appearing at the collector of transistor 11 may be expressed as:

$$v_c(t)=V-\frac{1}{C}\int_0^t i_c(t)\,dt \qquad (3)$$

where $i_c$ corresponds to the capacitor current, as indicated, and the assumption is made that switch 12 is opened at time $t=0$. The current at the collector of transistor 11, by Kirchhoff's law, is equal to:

$$i_c=i_e+i_s \qquad (4)$$

where $i_e$ is equal to the emitter current of transistor 11, as indicated, and $i_s$ is equal to the current flowing into the base of transistor 13. But, $$i_s=\frac{v_c(t)}{R_{in}} \qquad (5)$$

where $R_{in}$ is the input impedance at the base of transistor 13 and, $$i_e=\frac{V_R-kv_c(t)}{R_e} \qquad (6)$$

where $$k=\frac{R_2}{R_1+R_2} \qquad (7)$$

a predetermined percentage of the total resistive value of resistors $R_1$ and $R_2$. Substituting into Equation 3, one obtains:

$$v_c(t)=V-\frac{1}{C}\int_0^t\left(\frac{V_R-kv_c(t)}{R_e}+\frac{v_c(t)}{R_{in}}\right)dt \qquad (8)$$

Thus, $$v_c(t)=V-\frac{V_Rt}{R_eC}+\frac{k}{R_eC}\int_0^t v_c(t)\,dt-\frac{1}{R_{in}C}\int_0^t v_c(t)\,dt \qquad (9)$$

clearly, by setting $$k=\frac{R_e}{R_{in}} \qquad (10)$$

the two integrals in Equation 9 cancel and the resulting sweep voltage is:

$$v_c(t)=V-\frac{V_Rt}{R_eC} \qquad (11)$$

which is perfectly linear, as desired.

The factor $k$ is easily varied, to comply with the requirements of Equation 10, by adjusting the value of variable resistor $R_2$. Of course, the desired identity may be established empirically by adjusting variable resistor $R_2$ and viewing the output voltage on an oscilloscope if an analytical determination of $R_{in}$ is not expeditious.

Accordingly, the inherent source of sweep nonlinearity arising from the presence of a load across capacitor C is removed. Since resistor $R_2$ may be adjusted to compensate for other stray loading effects across the capacitor, the resulting sweep output displays extreme linearity regardless of the gain of transistor 13 or other minor circuit variables.

The principles of this invention find particular advantage in applications where slow sweep speeds are necessitated, yet where electrolytic capacitors would lack the necessary accuracy and stability. In such cases, smaller value nonelectrolytic capacitors must be used and hence smaller charging currents utilized to realize slow sweep speeds. It is in such applications that capacitor loading becomes a significant source of sweep nonlinearity. By utilizing the principles of this invention such limitations and disadvantages are overcome.

It is to be understood that the embodiments shown and described herein are illustrative of the principles of this invention only and that further modifications of this invention may be implemented by those skilled in the art without departing from the scope and spirit of the invention. For example, compensation may be accomplished by adjusting resistors $R_e$ or $R_1$, if so desired, instead of resistor $R_2$. Furthermore, fixed resistors may, of course, be used where the conditions necessary to satisfy Equation 10 may be determined a priori.

What is claimed is:

1. Circuit means for generating a linear sweep voltage comprising:
first transistor means,
first resistive means comprising two elements serially connected to the emitter of said first transistor means,
second transistor means,
capacitor means connected to the collector of said second transistor means,
conductor means connecting the base of said first transistor means and the collector of said second transistor means,
and second resistive means having a resistive value proportional to the input impedance of said first transistor means connected between the emitter of said second transistor means and the junction of said two elements of said first resistive means.

2. Circuit means for generating a linear sweep voltage comprising:
a source of potential,
a first transistor means having a collector connected to said source,
first resistive means comprising two elements having respective resistive values of $R_1$ and $R_2$ serially connected to the emitter of said first transistor means,
second transistor means, capacitor means connected between said source and the collector of said second transistor means,
second resistive means have a resistive value of $R_e$ proportional to the input impedance of said first transistor means connected between the emitter of said second transistor means and the junction of said two elements of said first resistive means,
and switching means having one terminal jointly connected to the base of said first transistor means and the collector of said second transistor means and another terminal connected to said source of potential.

3. A sweep circuit comprising:
a source of constant potential,
first transistor means,
capacitor means connected between said source and the collector of said first transistor means,
first resistive means,
second transistor means having a collector connected to said source and an emitter connected to said first resistive means,
switching means having one terminal jointly connected to the collector of said first transistor means and the base of said second transistor means and another terminal connected to said source of potential,
and second resistive means connected between the emitter of said first transistor means and a predetermined point intermediate the two terminals of said first resistive means, having a value proportional to the input impedance of said second transistor means.

4. A sweep circuit comprising:
a source of constant potential,
first transistor means,
capacitor means connected between said source and the collector of said first transistor means,
first resistive means,
second transistor means having a collector connected to said source and an emitter connected to said first resistive means,
switching means having one terminal jointly connected to the collector of said first transistor means and the base of said second transistor means and another terminal connected to said source of potential, and second resistive means, having a value proportional to the product of the value of the input impedance of said second transistor means and a predetermined percentage of the value of said first resistive means, connected between the emitter of said first transistor means and a predetermined point intermediate the two terminals of said first resistive means.

5. A sweep circuit comprising:
a source of contant potential,
first transistor means,
capacitor means connected between said source and the collector of said first transistor means,
first resistive means,
second transistor means having a collector connected to said source and an emitter connected to said first resistive means,
switching means having one terminal jointly connected to the collector of said first transistor means and the base of said second transistor means and another terminal connected to said source of potential,
and second resistive means connected between the emitter of said first transistor means and a predetermined point intermediate the two terminals of said first resistive means.

References Cited

UNITED STATES PATENTS

| | | | |
|---|---|---|---|
| 3,001,086 | 9/1961 | Martinez | 328—184 XR |
| 3,273,007 | 9/1966 | Schneider | 307—228 XR |
| 3,275,847 | 9/1966 | Kitchin | 307—228 |

DONALD D. FORRER, Primary Examiner

J. ZAZWORSKY, Assistant Examiner

U.S. Cl. X.R.

328—127, 184